(12) United States Patent  (10) Patent No.: US 8,531,550 B2
Fossum et al.  (45) Date of Patent: *Sep. 10, 2013

(54) METHOD OF OPERATING AN IMAGE SENSOR HAVING A DIGITAL EXPOSURE CIRCUIT

(75) Inventors: Eric R. Fossum, Wolfeboro, NH (US); Alexander I. Krymski, Pasadena, CA (US); Roger A. Panicacci, Los Angeles, CA (US); Christopher Clark, Pasadena, CA (US)

(73) Assignee: Round Rock Research, LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,631

(22) Filed: Nov. 7, 2011

(65) Prior Publication Data

US 2012/0057047 A1  Mar. 8, 2012

Related U.S. Application Data

(63) Continuation of application No. 12/706,382, filed on Feb. 16, 2010, now Pat. No. 8,054,339, which is a continuation of application No. 12/637,224, filed on Dec. 14, 2009, now Pat. No. 8,040,394, which is a continuation of application No. 11/121,956, filed on May 5, 2005, now Pat. No. 7,646,407, which is a continuation of application No. 09/298,306, filed on Apr. 23, 1999, now Pat. No. 6,906,745.

(51) Int. Cl.
 *H04N 5/235* (2006.01)
 *H04N 3/14* (2006.01)

(52) U.S. Cl.
 USPC .................... 348/229.1; 348/362; 348/297

(58) Field of Classification Search
 USPC .................. 348/229.1, 362, 297, 221.1, 296; 358/443, 482
 See application file for complete search history.

(56) References Cited

U.S. PATENT DOCUMENTS

| | | | |
|---|---|---|---|
| 4,684,995 A * | 8/1987 | Baumeister | 348/364 |
| 4,686,648 A | 8/1987 | Fossum | |
| 4,744,623 A | 5/1988 | Prucnal et al. | |
| 4,776,925 A | 10/1988 | Fossum et al. | |
| 4,920,069 A | 4/1990 | Fossum et al. | |
| 5,055,900 A | 10/1991 | Fossum et al. | |
| 5,079,622 A | 1/1992 | Toshinobu | |
| 5,080,214 A | 1/1992 | Fossum | |
| 5,194,960 A | 3/1993 | Ota | |
| 5,236,871 A | 8/1993 | Fossum et al. | |
| 5,386,128 A | 1/1995 | Fossum et al. | |
| 5,471,515 A | 11/1995 | Fossum et al. | |
| 5,504,524 A | 4/1996 | Lu et al. | |
| 5,512,950 A | 4/1996 | Watanabe et al. | |
| 5,548,773 A | 8/1996 | Kemeny et al. | |
| 5,638,123 A | 6/1997 | Yamaguchi | |
| 5,665,959 A | 9/1997 | Fossum et al. | |

(Continued)

*Primary Examiner* — Nhan T Tran
(74) *Attorney, Agent, or Firm* — Lerner, David, Littenberg, Krumholz & Mentlik, LLP

(57) ABSTRACT

Automatic exposure adjusting device considers the image on a pixel-by-pixel basis. Each pixel is characterized according to its most significant bits. After the pixels are characterized, the number of pixels in any particular group is counted. That counting is compared with thresholds which set whether the image is over exposed, under exposed, and can optionally also determine if the image is seriously over exposed or seriously under exposed. Adjustment of the exposure is carried out to bring the image to a more desired state.

18 Claims, 6 Drawing Sheets

(56) References Cited

U.S. PATENT DOCUMENTS

| | | | |
|---|---|---|---|
| 5,710,954 | A | 1/1998 | Inoue et al. |
| 5,734,426 | A | 3/1998 | Dong |
| 5,793,322 | A | 8/1998 | Fossum et al. |
| 5,822,222 | A * | 10/1998 | Kaplinsky et al. ......... 250/316.1 |
| 5,841,126 | A | 11/1998 | Fossum et al. |
| 5,880,691 | A | 3/1999 | Fossum et al. |
| 5,886,659 | A | 3/1999 | Pain et al. |
| 5,887,049 | A | 3/1999 | Fossum |
| 5,909,026 | A | 6/1999 | Zhou et al. |
| 5,920,274 | A | 7/1999 | Gowda et al. |
| 5,949,483 | A | 9/1999 | Fossum et al. |
| 5,952,645 | A | 9/1999 | Wang et al. |
| 5,990,506 | A | 11/1999 | Fossum et al. |
| 5,995,163 | A | 11/1999 | Fossum |
| 6,005,619 | A | 12/1999 | Fossum |
| 6,008,486 | A | 12/1999 | Stam et al. |
| 6,021,172 | A | 2/2000 | Fossum et al. |
| 6,040,860 | A | 3/2000 | Tamura et al. |
| 6,057,539 | A | 5/2000 | Zhou et al. |
| 6,061,091 | A * | 5/2000 | Van de Poel et al. ......... 348/364 |
| 6,124,891 | A | 9/2000 | Homma et al. |
| 6,141,047 | A | 10/2000 | Kawai et al. |
| 6,282,462 | B1 | 8/2001 | Hopkins |
| 6,486,503 | B1 | 11/2002 | Fossum |
| 6,515,701 | B2 | 2/2003 | Clark et al. |
| 6,816,200 | B1 | 11/2004 | Gough |
| 6,906,745 | B1 * | 6/2005 | Fossum et al. ............. 348/229.1 |
| 7,646,407 | B2 * | 1/2010 | Fossum et al. ................ 348/362 |
| 8,040,394 | B2 * | 10/2011 | Fossum et al. ............. 348/229.1 |
| 8,054,339 | B2 * | 11/2011 | Fossum et al. ............. 348/229.1 |
| 2010/0134653 | A1 | 6/2010 | Fossum et al. |

* cited by examiner

METHOD OF OPERATING AN IMAGE SENSOR HAVING A DIGITAL EXPOSURE CIRCUIT

CROSS-REFERENCE TO RELATED APPLICATIONS

This application is a continuation of U.S. application Ser. No. 12/706,382 which was filed on Feb. 16, 2010 and is scheduled to issue as U.S. Pat. No. 8,054,339 on Nov. 8, 2011, which is a continuation of U.S. application Ser. No. 12/637,224, which was filed on Dec. 14, 2009, which is a continuation of U.S. application Ser. No. 11/121,956, which was filed on May 5, 2005 and issued as U.S. Pat. No. 7,646,407, which is a continuation of U.S. application Ser. No. 09/298,306, which was filed on Apr. 23, 1999, which issued as U.S. Pat. No. 6,906,745, which claims the benefit of the U.S. Provisional Application No. 60/082,793, which was filed on Apr. 23, 1998, the entire disclosures of which are incorporated herein by reference.

BACKGROUND OF THE INVENTION

CMOS active pixel sensors represent a digital solution to obtaining an image of an impinging scene. CMOS technology enables integrating electronics associated with the image sensing onto the chip. This includes, for example, one or more analog-to-digital converters on the chip, as well as timing and control circuitry.

One important feature of a well-defined image is an amount exposure. Some cameras include automatic gain and exposure control. The automatic gain and exposure control determines if the image is underexposed or overexposed, and can adjust some feature of the image acquisition to correct the exposure amount.

Existing CCD cameras select the exposure time based on some feature of the scene being imaged. Some cameras, for example, compute the average intensity over the entire pixel array. Other cameras compute the average intensity over a central area of the CCD. The average is often calculated by a digital signal processor which is separate from the CCD chip.

BRIEF SUMMARY OF THE INVENTION

The present system teaches a programmable threshold indicator based on accumulated and programmable measurements of image pieces. The digital image data stream is analyzed by the counting the number of samples within a given interval of intensities to form information indicating an image histogram. The sample count is compared with programmable thresholds.

DETAILED DESCRIPTION

The inventors recognize that in some particular images, exposure control by simply computing the average of the image could produce disadvantageous results. For example, consider a scene of black and white stripes. Fifty percent of the image could be very bright, and the other fifty percent could be completely dark. The average is fifty percent which could be considered the correct exposure. Both image portions from the bright scene and the dark scene, however, could be poor.

Figure 1:
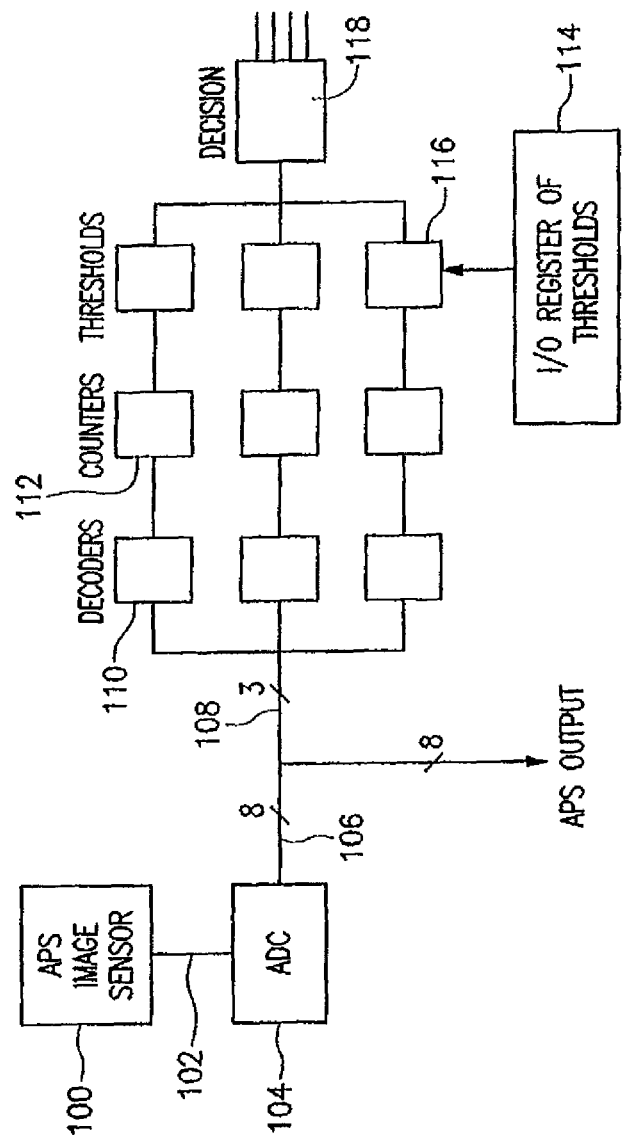
FIG. 1 shows a basic block diagram.

The present system provides a programmable threshold indicator based on measurements of various portions of the image. A block diagram of the system is shown in FIG. 1.

Active pixel image sensor 100 includes an array of units, e.g., rows and columns, of CMOS active pixels. Each preferably includes an in-pixel buffer transistor configured as a source follower, and an in-pixel row or column select transistor. The output of the sensor can be provided either single pixel at a time, or as a parallel group of pixel units 102 to the analog-to-digital converter 104. ADC 104 preferably produces an 8-bit output 106. The two to three most-significant bits of the analog-to-digital converter are usually enough to analyze intensity distribution.

The three most-significant bits 108 are coupled to pixel characterization elements 110. These detect whether the states of the three bit output 108 have a specified characteristics. When the states have the specified characteristics, the decoder produces an output. Counters 112 count the output, effectively counting the number of times that the bits are coincident with the values. Therefore, the counters 112 keep a count, for each frame, of the number of samples which have specified values.

A number of thresholds are maintained by I/O register 114. Comparing elements 116 compare the counter outputs with the thresholds from the interface register. If one or more of these thresholds are exceeded, then decision block 118 produces a command to either increment or decrement the exposure: e.g., the shutter width or gain of image acquisition. This can be done frame by frame, or for a group of frames.

A first embodiment uses a two-threshold simple-scheme. This takes into account only the two most-significant bits. In this scheme, the relative number of data whose MsBs are "11" are counted. The number of data in the lower half segment of the data scale (e.g. the most significant bit [MSB] is equal to 0) is also counted. The data "11" is considered as being close to saturation. An exemplary threshold for the amount of that data can be thirty percent. Similarly, the tolerance for "dark" data, in which the MSB is zero, is restricted to be 75%. Step 202 detects if the first threshold in which both major bits are "11" for more than thirty percent of the data. This is taken as an overexposed condition at 204 and the integration time or gain is lowered. The second threshold is investigated at 210. If five percent of the data is dark (MSB is 0), the data is taken as underexposed data and the integration time or gain is increased.

The thresholds must be selected with an amount of hysteresis which is effective to avoid oscillations when the image has many contrasts i.e. between black and white. For example, the sum of the two percentages should exceed 100 percent.

Figure 3:
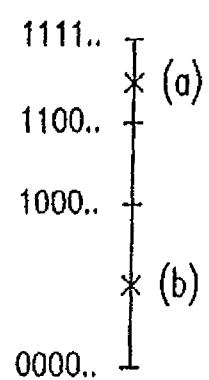
FIG. 3 shows a point diagram of the FIG. 2 embodiment.

FIG. 3 shows a bar graph with the overexposure/underexposure parameters. The point A in FIG. 3 is at an overexposed position. If more than 30 percent of the image is in this position, then the image is taken to be overexposed and the gain or integration time is lowered. Conversely, point B is in an underexposed position. If more than 75 percent of the image is in this position, then the image is taken to be underexposed.

Figure 4:
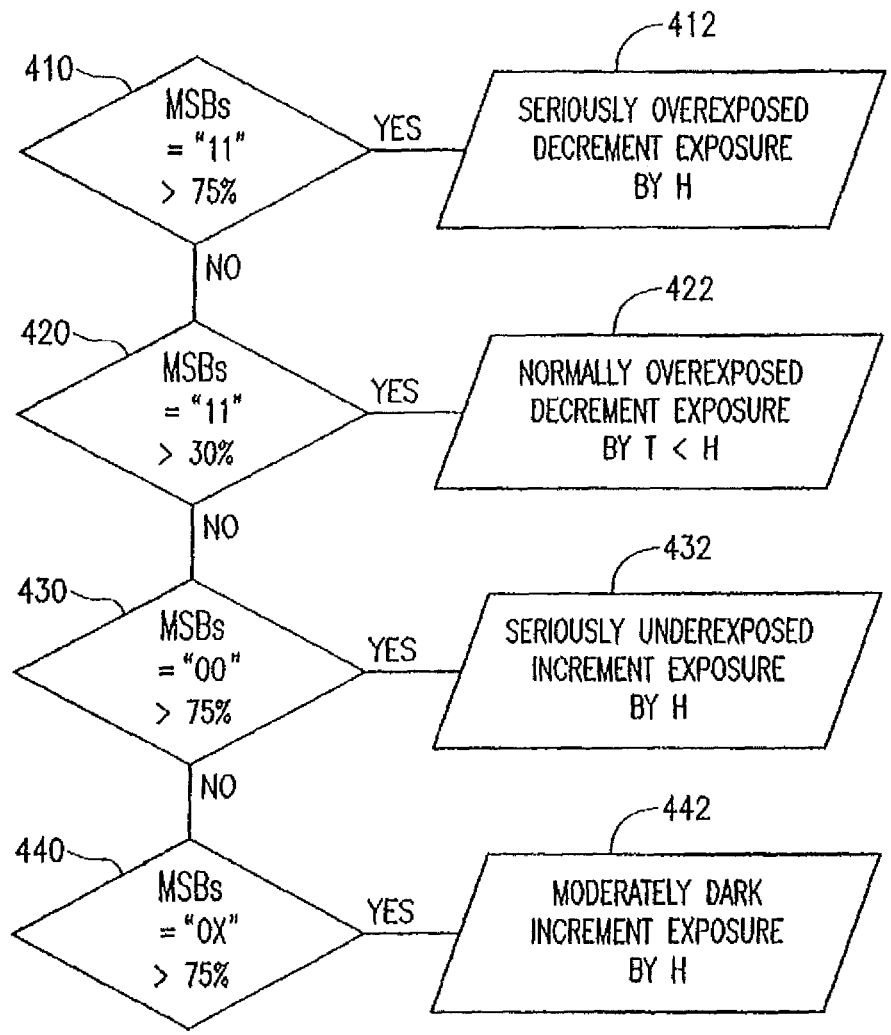
FIG. 4 shows a flowchart of a second, three-threshold embodiment.

A second embodiment which operates according to the flowchart of FIG. 4 uses a three threshold advance scheme.

Figure 2:
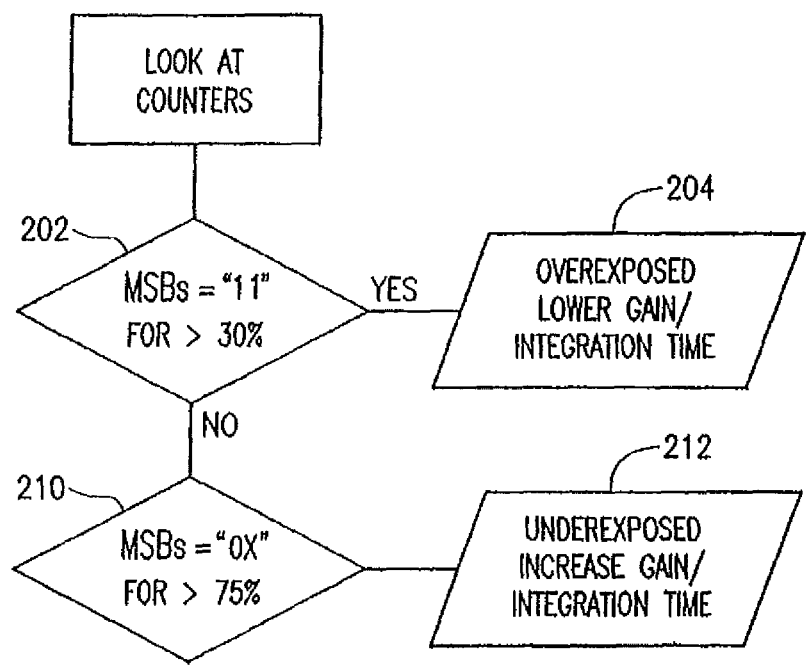
FIG. 2 shows a flowchart of operation of a two-threshold embodiment.

This takes only the two highest bits at the input to the indicator, as in the first system. However, this scheme uses three decoders and three counters as shown in FIG. 1. This system counts: (a) the number of samples in which the upper bits are "11"; (b) the number of samples in which the most significant bit is "0"; and (c) the number of samples in which the upper bits are both "00". This provides more information about the image than the FIG. 2 system. This also enables adjusting the exposure/gain in two steps.

FIG. 4 shows a flowchart of the second embodiment. At step 410, the decision making process determines if the relative number of samples determined by a, in which both MsBs are "11" is more than 75 percent. If so, then the image is considered to be grossly overexposed. At step 406, the exposure/gain is decremented by a higher value H.

If the result of step 410 is No, step 420 tests if the relative number of samples is more than 30 percent. If so, the image is considered as being normally overexposed at 422. A tuning decrement T is applied at step 422 where T less than H.

If the relative number of sample c, the very dark pixels, is more than 75 percent at step 430, then the image is considered as seriously underexposed. In this case, the exposure/gain is incremented by the higher value H at step 432.

Finally, if none of the other steps are true, the relative number of samples b, that is moderately dark pixels that are not very dark, are tested at 440. If this value is more than 75 percent detected at step 416, then the image is considered as moderately dark at 442. A tuning increment T is added to the exposure or gain.

This can be carried out on a frame by frame basis. These thresholds can also be programmable, to allow more bright or dark scenes. The programmable thresholds can be made by user manual intervention, or by an automatic intervention from the computer system.

Figure 5:
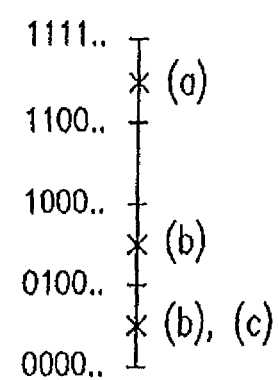
FIG. 5 shows a point chart.

FIG. 5 shows a bar chart showing the placement of the pixels within groups a, b, or c, similar to that in FIG. 3.

Figure 6:
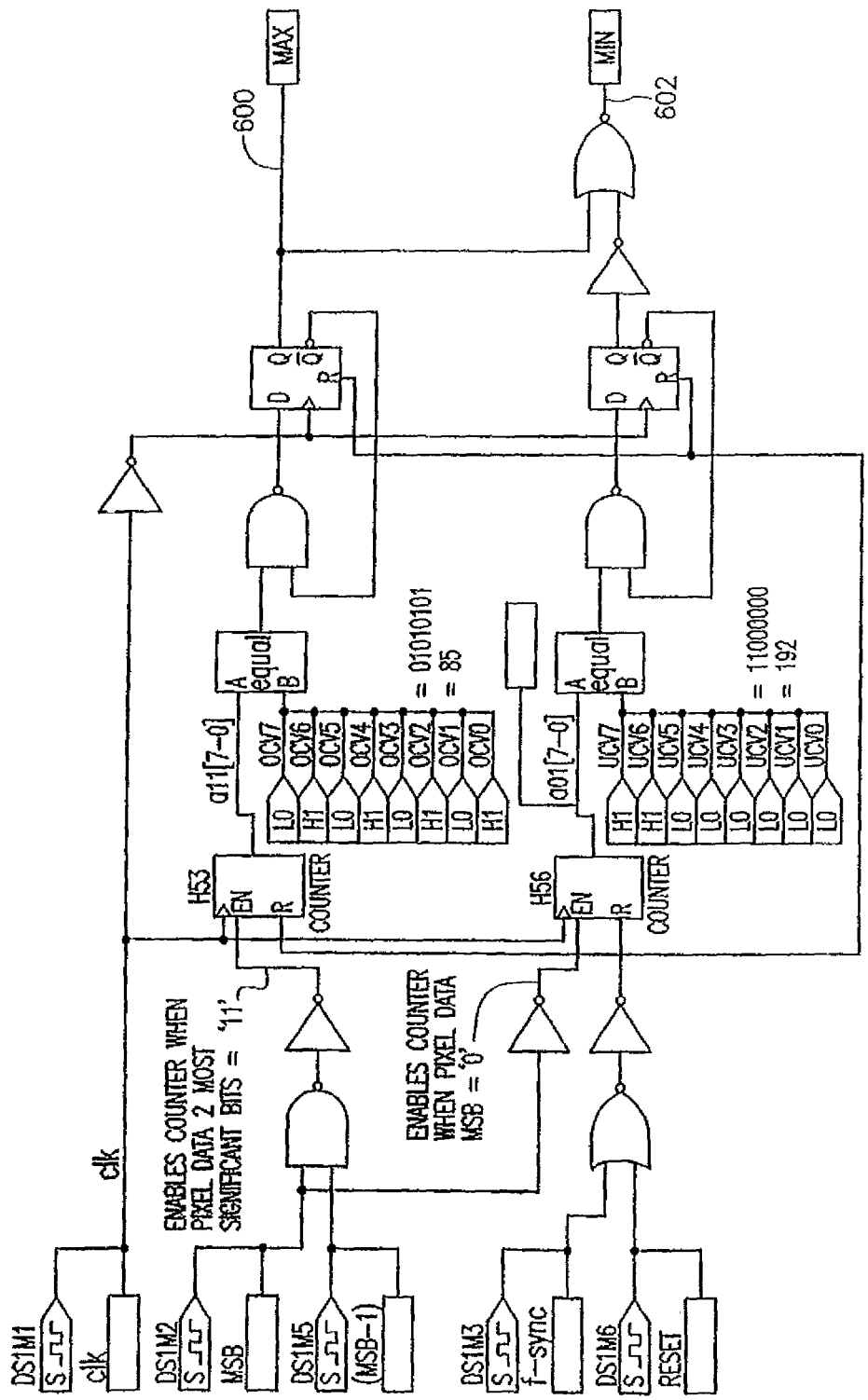
FIG. 6 shows exemplary circuitry for carrying out this embodiment.

An example circuitry is shown in FIG. 6. It should be understood that this circuitry is exemplary only, and that other similar circuits could be easily formed using either a processor or hard wire gates using hardware definition language. Of course, this operation could also be carried out using a programmed processor.

Figure 7:
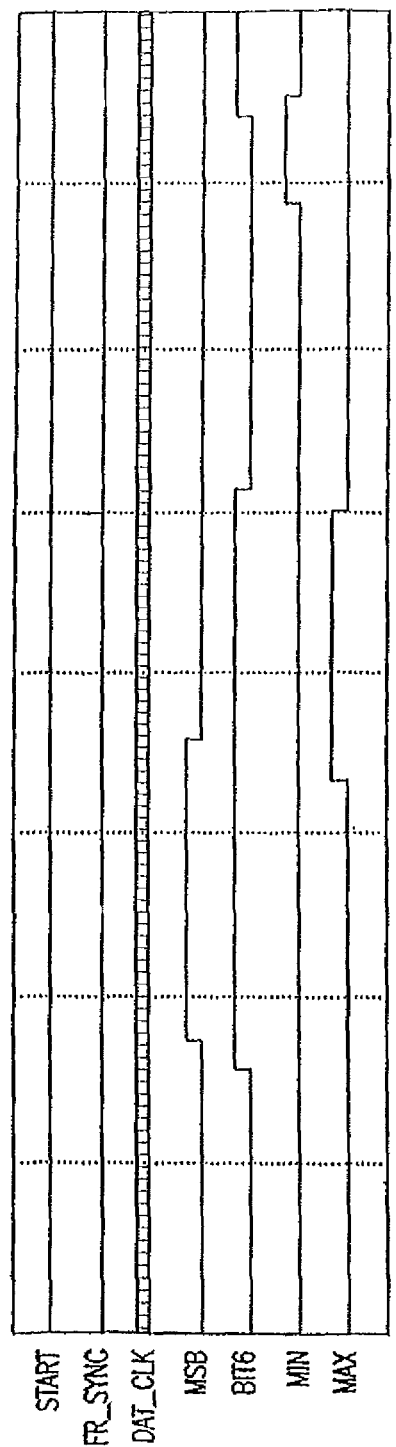
FIG. 7 shows results of simulation.

FIG. 7 shows results of a simulation using a simple test. The circuit signals maxed during the second frame as the number of 11 sample has exceeded 30 percent and min in the third frame as after two 00 counts has approached 75 percent of the total samples.

Although only a few embodiments have been disclosed above, other modifications are within the disclosed features.

For example, the system as described could be carried out using a processor or a digital signal processor. Preferably, however, all of the subjects in FIG. 1 are carried out on the same substrate.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of operating an image sensor comprising:
counting a number of digital values indicating an overexposed pixel output during at least one image frame from said image sensor;
counting a number of digital values indicating an underexposed pixel output during said at least one image frame;
comparing results of said first and second counters with predetermined thresholds; and
determining whether to increase, decrease, or maintain an exposure of a next frame of said image sensor based on the comparison results.

2. The method of claim 1, further comprising reviewing only a predetermined number of most significant bits of each of said digital values and providing a signal for counting according to said most significant bits.

3. The method of claim 1, wherein a decision element is used to determine whether to increase, decrease, or maintain an exposure of a next frame of said image sensor.

4. The method of claim 1, wherein a comparator is configured to compare the results of said first and second counters with the predetermined thresholds.

5. The method of claim 4, wherein the predetermined thresholds include a brightness threshold wherein counted digital values over the brightness threshold can indicate overexposure and a darkness threshold wherein counted digital values under the darkness threshold can indicate underexposure for the at least one image frame.

6. The method of claim 4, further comprising decreasing the exposure of the next frame if the result of the first counter exceeds the first predetermined threshold, and increasing the exposure of the next frame if the result of said second counter exceeds the second predetermined threshold.

7. The method of claim 1, wherein there are four predetermined thresholds, two of which indicate an overexposed image if the counters exceed one of the two predetermined thresholds for an overexposed image and two of which indicate an underexposed image if the value from the counters is less than one of the two predetermined thresholds which indicate an underexposed image.

8. The method of claim 4, wherein the predetermined thresholds include a first value indicative of what number of the plurality of digital values can indicate overexposure and a second value indicative of what number of the plurality of digital values can indicate underexposure for the at least one image frame.

9. The method of claim 8, wherein the decision element decreases said exposure of the next frame if the result of the first counter exceeds the first value, and increases the exposure of the next frame if the result of the second counter exceeds the second value.

10. The method of claim 1, wherein the comparing step compares a percentage of the digital values indicating an overexposed pixel output and a percentage of the digital values indicating an underexposed pixel output.

11. The method of claim 3, wherein the decision element increases or decreases the exposure by adjusting at least one of:
a shutter width of the image sensor; and
a gain of the image sensor.

12. A method of controlling exposure comprising:
obtaining a plurality of digital values from a current image frame representing values of pixels of an image sensor;
reviewing the plurality of digital values representing values of pixels of an image sensor;
comparing the digital values with predetermined threshold values;
determining if each digital value in said plurality of digital values indicates an overexposed pixel or an underexposed pixel; and
adjusting exposure of a next frame of said image sensor according to said determination.

13. A method as in claim 12, the step of reviewing further comprising reviewing only a predetermined number of most significant bits of each of the digital values.

14. A method as in claim 12, the step of comparing further comprising:
   comparing a count of the digital values in the plurality of digital values indicating an overexposure with a first predetermined threshold; and
   comparing a count of the digital values in the plurality of digital values indicating an underexposure with a second predetermined threshold.

15. A method as in claim 14, the step of adjusting exposure of the next frame further comprising:
   decreasing exposure of the next frame if the count of the digital values in the plurality of digital values indicating an overexposure exceeds the first predetermined threshold; and
   increasing exposure of the next frame if the count of the digital values in the plurality of digital values indicating an underexposure exceeds the second threshold.

16. A method as in claim 12, the step of comparing further comprising:
   comparing a percentage of the digital values in the plurality of digital values indicating an overexposure with a first predetermined threshold; and
   comparing a percentage of the digital values in the plurality of digital values indicating an underexposure with a second predetermined threshold.

17. A method as in claim 16, the step of adjusting exposure of said next frame further comprising:
   decreasing exposure of the next frame if the percentage of the digital values in the plurality of digital values indicating an overexposure exceeds the first threshold; and
   increasing exposure of the next frame if the percentage of the digital values in the plurality of digital values indicating an underexposure exceeds the second threshold.

18. A method as in claim 12, the step of adjusting exposure of said next frame comprising adjusting at least one of:
   a shutter width of the image sensor; and
   a gain of said image sensor.

* * * * *